(12) United States Patent
Ariyoshi et al.

(10) Patent No.: US 6,524,766 B1
(45) Date of Patent: Feb. 25, 2003

(54) OPTICAL DISK MEDIUM

(75) Inventors: Tetsuo Ariyoshi, Kokubunji (JP);
Motoyasu Terao, Hinode (JP); Takeshi Shimano, Tokorozawa (JP); Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 09/650,728

(22) Filed: Aug. 30, 2000

(30) Foreign Application Priority Data

Sep. 9, 1999 (JP) .......................................... 11-255316

(51) Int. Cl.$^7$ ................................................ G11B 7/24
(52) U.S. Cl. .................. 430/270.13; 430/945; 428/64.2
(58) Field of Search ............................. 430/945, 270.1, 430/270.13; 428/64.1, 64.2

(56) References Cited

U.S. PATENT DOCUMENTS

| 4,775,568 A | * 10/1988 | Itoh et al. | .................... 430/945 |
| 5,456,961 A | * 10/1995 | Iida et al. | .................... 430/945 |
| 5,709,978 A | * 1/1998 | Hirotsune et al. | ..... 430/270.13 |

FOREIGN PATENT DOCUMENTS

| EP | 0884723 | * 12/1998 |
| JP | 62-127287 | * 6/1987 |
| JP | 07-287870 | * 10/1995 |
| JP | 09-035331 | * 2/1997 |

OTHER PUBLICATIONS

Shintani et al. "A New Super–Resolution Film Applicable to Read–Only and Rewritable Optical Disks.", Jpn. J. Appl. Phys., vol. 38(3B) part 1, pp 1656–1660 (Mar. 1999).*
Tsujioka et al., Optical Review vol. 4 (6) pp. 655–659 (1997).
Yosuda et al., Jpn J. Appl. Phys., vol. 32 (11B) part 1, pp 5210–5213 (1993).
Fukumdo et al., Jpn J. Appl. Phys., vol. 31 (2B) part 1, pp 529–533 (1992).
Shintani, et al., Joint Moris/ISOM 1997 Post Deadline papers, Tech. Digest pp 21–22.
Asai, et al., Preprint—Soc. of Japan Appl. Phys. 19p–K–6 p. 100 (1994).

* cited by examiner

Primary Examiner—Martin Angebranndt
(74) Attorney, Agent, or Firm—Mattingly, Stanger & Malur, P.C.

(57) ABSTRACT

The optical disk medium permits an increase in recording density using a complex refractive index variation of an inorganic oxide film in a super-resolution medium using an inorganic oxide film. The reflectance of the disk increases due to the complex refractive index variation of the inorganic oxide film. Specifically, in the case where the inorganic oxide film is an oxide film comprising Co, a reflect addition film is provided. The effective spot diameter used for read-out is reduced, thereby increasing recording density. By using a material for which the complex refractive index varies sharply, the recording density can be approximately doubled.

11 Claims, 11 Drawing Sheets

OPTICAL DISK MEDIUM

BACKGROUND OF THE INVENTION

1. Field of the Invention

This invention relates to an optical disk medium which records and reproduces information using light, and in particular to a super-resolution optical disk medium which reads out recording marks at equal to or less than an optical resolution determined by a diffraction limit light spot diameter.

2. Description of the Related Art

Due to recent advances in information technology, information communications and multimedia technology, there is an increasing demand for higher densities and higher capacities of optical disk media. The upper limit of recording density of an optical disk medium is mainly limited by the beam diameter of a light spot which records or reads out information. It is known that, if the wavelength of a light source is $\lambda$ and the numerical aperture of an object lens required to form the light spot is NA, the light spot diameter is effectively given by $\lambda$/NA. If the light spot diameter used is reduced, the recording density can be increased, but the wavelength $\lambda$ of the light source is thought to be limited due to absorption by an optical element or the sensitivity characteristics of a detector, while increase of NA is effectively limited by the permitted amount of tilt of the medium. In other words, there is a limit to increase of recording density achievable by reduction of the light spot diameter.

As a means of overcoming this limitation, super-resolution media exist in the art which reduce the effective light spot diameter using the optical characteristics of the recording medium. Typical examples of this super-resolution medium technology are as follows:

(1) Magnetic super-resolution (Jpn. J. Appl. Phys 31 (1992), pp. 529–533)
(2) Super-resolution using inorganic oxide films (Joint MORIS/ISOM '97 Post-Deadline Papers Technical Digest, pp.21–22)
(3) Super-resolution reading by mask layer using organic pigments (Preprint of the Soc. of Jpn. Appl. Phys. (1994-Fall), p.1000(19p-K-6))
(4) Super-resolution by photo-chromic mask layer (Optical Review 4 (1997), pp.655–659)
(5) Super-resolution reading using melting of phase change material (Jpn. J. Appl. Phys. 32 (1993), p.5210).

These techniques create an effect which masks recording marks so as to make the effective spot contributing to recording/read-out smaller by using the variation of temperature distribution or transmittance, and thereby increase the recording/read-out density.

FIG. 1 schematically shows this medium super-resolution effect. A light spot 11 scans the surface of a super-resolution medium in a direction shown by 13, and thereby performs recording/read-out. During normal read-out, all recording marks 12 inside the light spot 11 contribute to the read-out signal, but in the case of super-resolution media, regions apart from a center region 14 in the light spot which has a strong light intensity are masked, and only a recording mark 15 inside the region 14 is read out. This is equivalent to reducing the effective light spot diameter contributing to read-out. Conversely to the example of FIG. 1, it is also possible to mask the region 14, and detect recording marks outside the region 14 with the light spot 11.

Method (1) can be applied only to magneto-optical disks, and cannot be applied to read only disks such as CD-ROM and DVD-ROM which are presently widely available. Methods (3) and (4) use organic materials as mask layers which are easily damaged by heat, consequently, the total number of possible reads is of the order of 10,000 or less, and as the reliability of reading out information is low, they have not been commercialized. Further as they are destroyed by heat, they cannot be applied to rewritable disks. Method (5) employs fusion of a phase change material in the super-resolution mask layer, so film flow occurs due to repeat reads, the number of possible reads is limited to about 10,000 or less, and as the reliability of information read-out is low, it also has not been commercialized. Moreover, as read-out is performed at a temperature above the melting point of the phase change material, with a rewritable disk, recording marks disappear at high temperatures during read-out, so this method can be used only for read-only disks. However, in Jpn. J. Appl. Phys. 38 (1999), p.1656, it is reported that by using a disk having an inorganic oxide super-resolution film, the disk can be read 100,000 or more times, and that a phase change medium applying this super-resolution film can be rewritten. This shows that, as method (2) employs inorganic materials, the disk,is not readily destroyed by heat as compared to a disk with organic materials. Due to this fact, inorganic oxide super-resolution films are expected to be applied as super-resolution materials suitable for both read-only disks and rewritable disks.

An inorganic super-resolution film has a property whereby its complex refractive index changes when it is irradiated by a laser beam of intensity exceeding a certain threshold. When this inorganic super-resolution film is applied to an optical disk, it will have a multi-layer structure such as shown in FIG. 2. When this optical disk is read out, the complex refractive index changes in the center part of the light spot where the temperature is high, and the reflectance also changes in the region where the complex refractive index changed due to multi-interference in the laminated film. As a result, the signal corresponding to part of the light spot is emphasized when the disk is read, and the effective spot diameter contributing to read-out is reduced.

A super-resolution film 23, substrate protecting film 22 and thermal buffer film 24 are designed with regard to the following three-stage mechanism.

(1) Light absorption occurs in the super-resolution film 23.
(2) The heat produced by-this light absorption is not dissipated by the reflecting film 25, but causes a temperature rise in the super-resolution film.
(3) The complex refractive index of the super-resolution film 23 changes, and the reflectance changes due to multi-interference in the laminated film.

The substrate protecting film 22 also has the role of preventing deformation of the substrate 21 due to the heat produced in the super-resolution film 23.

A prototype disk was designed and manufactured using an oxide film (referred to hereafter as a Co—Si—Na—Ca—O film) comprising Co, Si, Na, Ca for the super-resolution film 23, a ZnS—SiO$_2$ film for the substrate protecting film 22 and thermal buffer film 24, and an Al—Ti film for the reflecting film 25. The reflectance R (before change) and R (after change) was calculated relative to the film thickness of the substrate protective film 22 and thermal buffer film 24 taking account of multi-interference in the multi-layer film, assuming that the change of complex refractive index of the Co—Si—Na—Ca—O film was from n (refractive index)= 2.48 and k (extinction coefficient)=0.48, to n=2.41, k=0.57 when the incident light became intense. FIG. 3 is a plot of the calculated results for the reflectance variation rate (R (after change)—R (before change))/R (before change)

assuming the film thickness of the Co—Si—Na—Ca—O film was 50 nm and the film thickness of the reflecting film 25 was 100 nm. From these results, it is seen that the reflectance changes most when the substrate protective film 22 has a thickness in the range from 120 nm to 150 nm, and the thermal buffer film 24 has a thickness in the range from 30 nm to 50 nm. A disk prototype was therefore manufactured comprising a laminate of the substrate protecting film 22 (ZnS—SiO$_2$ film) of thickness 120 nm, the super-resolution film 23 (Co—Si—Na—Ca—O film) of thickness 50 nm, the thermal buffer film 24 (ZnS—SiO$_2$ film) of thickness 30 nm, and the reflecting film 25 (Al—Ti film) of thickness 100 nm. The results of measuring reflected light intensity relative to incident light intensity on this prototype disk are shown in FIG. 4. In the case of result 41 where there is no super-resolution film (□(empty squares)), the incident light intensity is directly proportional to the reflected light intensity, i.e., the reflectance does not vary even if the incident light intensity is increased. In the case of result 42 when the super-resolution effect is present (♦(black diamonds)), the direct proportional relationship breaks down when the light intensity is increased, and the reflectance drops. The results of measuring the amplified read-out signal from this disk are shown in FIG. 5. The recording marks are single frequency repeat phase pits (mark/space ratio=1:1), and the signal amplitude was normalized by the reflected light level. The phase pits were formed by physical imperfections on the substrate and were of such a depth that the phase difference was λ/6. Measurements were performed with an optical disk tester at a wavelength of 660 nm and object lens NA of 0.6. Compared to the case of result 51 when the super-resolution effect was absent, result 52 when the effect was produced shows that the amplitude of a mark length of 0.28 μm in the vicinity of the optical cut off (mark length 0.275 μm) increases. However, above a mark length of 0.35 μm, the amplitude again decreases and recording density increase characteristics cannot be obtained.

To investigate the reason for these characteristics, the effective read-out spot shape on the disk was calculated by a simulation. FIG. 6 shows results of plotting the ordinary read-out spot shape and the effective read-out spot shape in the spot scanning direction when the super-resolution effect was produced after normalizing by the respective peak values. Compared to an ordinary read-out spot 61, an effective read-out spot 62 when the super-resolution effect was present has an intensity distribution peak with a sharper rise but a broader width. As the width is broader, the overall resolution decreases, and the amplitude in the vicinity of the mark length of 0.35 μm falls considerably. On the other hand, as the peak rises more sharply, the amplitude of the mark length of 0.28 μm which is a high frequency component increases. This is considered to give rise to the read-out signal amplitude characteristics shown in FIG. 5.

It was clear that, in a construction where the reflectance falls due to change of complex refractive index of the super-resolution film, as the effective read-out spot diameter is larger, read-out signal amplitude characteristics which allow higher recording densities cannot be obtained.

SUMMARY OF THE INVENTION

It is therefore an object of this invention, which was conceived in view of the above problem, to provide an optical disk medium capable of high recording densities.

In view of the above object, the optical disk medium of this invention comprises a substrate and a laminated film comprising two or more layers of thin film, these layers being comprised of an inorganic material excepting for a recording layer of the thin film and a resin film protecting the thin film, wherein the layers of the thin film are in the solid-state when an information reproducing light is incident, and the reflectance of the thin film increases with increase of incident light intensity.

The thin film of the optical disk medium further comprises two or more groups on the substrate.

At least one of a disk identification signal, an optimum read-out light intensity value and an optimum recording light intensity value is recorded in an information recording/read-out region of the surface of the optical disk medium.

A trial read-out region is provided in the information recording/read-out part of the optical disk to set an optimum read-out light intensity value when the optical disk is read out.

A trial recording region is provided in the information recording/read-out part of the optical disk medium to set an optimum recording light intensity value or an optimum recording waveform pattern when information is recorded on the optical disk.

At least one layer of the laminated film of this optical disk medium is an oxide thin film comprising Co.

A thin film having optical constants different from those of the substrate is further interposed, directly or via another layer, between the oxide thin film comprising Co and the substrate.

The thin film having optical constants different from those of the substrate comprises Ge, Si and N.

Alternatively, the thin film having optical constants different from those of the substrate comprises Au, Ag, Al.

The reflectance during read-out from this optical disk medium is from 1.3 times to 1.7 times the reflectance at a light intensity approximately ¼ that of the read-out light. Alternatively, the reflectance during read-out from this optical disk medium is from 3.0 times to 4.0 times the reflectance at a light intensity of approximately ¼ the read-out light.

DETAILED DESCRIPTION OF THE PREFERRED EMBODIMENTS

This invention will now be described in detail with reference to the drawings.

The essential construction of a device which records/read-out the optical disk medium of this invention is as follows.

The device comprises a laser light source having a wavelength of 660 nm, a means to converge the laser light to a beam and further to converge the beam on the optical disk medium and a means to displace the converging means and optical disk medium relative to one another. This displacement comprises at least one of a rotation or parallel displacement of the optical disk medium, and motion in a perpendicular direction to the optic axis of a converging lens. Further provided are an optoelectric conversion means which converts high and low reflected light levels from the optical disk medium to electrical signals, and a laser beam autofocus or autotracking means, which in this embodiment are housed in an optical head. The optical head is moved relative to the optical disk medium by a linear actuator or a swing arm. Of these, the laser light source and the optoelectric means which converts high and low reflected light levels from the optical disk medium may be housed in a different case to the means which converges the laser beam on the optical disk medium. An address information detecting means which detects address information from electrical signals obtained by reproducing address information marks on the optical disk medium, and a read-out signal demodulating circuit, are provided. It is also preferred that the device comprises a means to adjust the angle formed by the converged laser beam and the optical disk medium to prevent deterioration of the light spot due to the effect of aberration.

Figure 7:
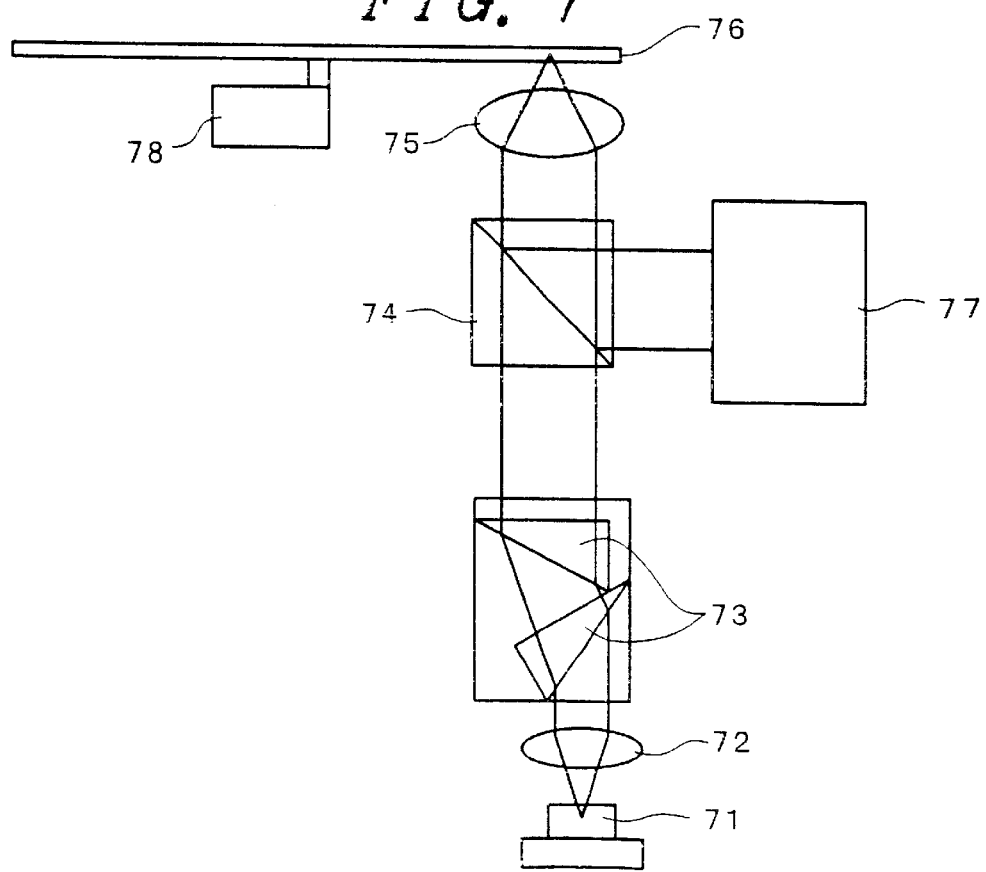
FIG. 7 is a schematic view of an optical system of an optical disk.

FIG. 7 shows an ordinary optical system for optical disks. A light beam from a semiconductor laser 71, which is a light source, is converged to an effectively parallel beam by a collimator lens 72, and the light intensity distribution is shaped to be effectively circular by a beam-shaping prism 73. This effectively circular, parallel beam passes through a beam splitter 74, and is converged on an optical disk medium 76 comprising a super-resolution film by an object lens 75. The reflected light is split by the beam splitter 74, and led to a detecting optical system 77. The optical disk medium 76 is rotated by a spindle motor 78, and a light spot is thereby made to scan the optical disk medium 76. In the detecting optical system 77, signals are identified from the variation in the polarization direction of the reflected light and the variation in the reflected light intensity. The recording marks recorded on the optical disk medium 76 are read, while at the same time, focusing error signals and tracking error signals of the light spot relative to the optical disk medium 76 are detected, and the positional error of the light spot is corrected by feedback to the position of the object lens 75. The numerical aperture (NA) of the object lens is assumed to be 0.6.

It is preferable for the user that this device can read both the super-resolution optical media (optical disk media) of this invention and ordinary media which do not have a super-resolution effect, thereby obviating the need for a large number of devices. For this purpose, it is necessary to change over the gain of the detector, read-out light intensity, recording light intensity, recording waveform and disk rotation speed depending on whether a super-resolution medium or an ordinary medium is being deployed. This can be accomplished simply by means of electrical control, and therefore does not require major modifications to the optical systems of devices which record and read out ordinary media.

Figure 1:
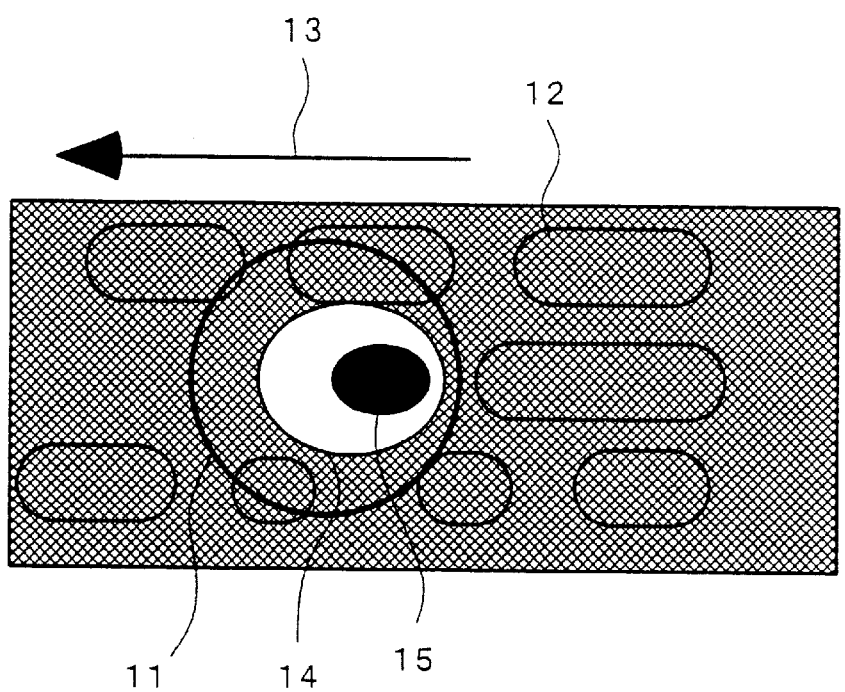
FIG. 1 is a schematic view of an effective read-out spot reduction effect due to a super-resolution medium technique.
Figure 2:
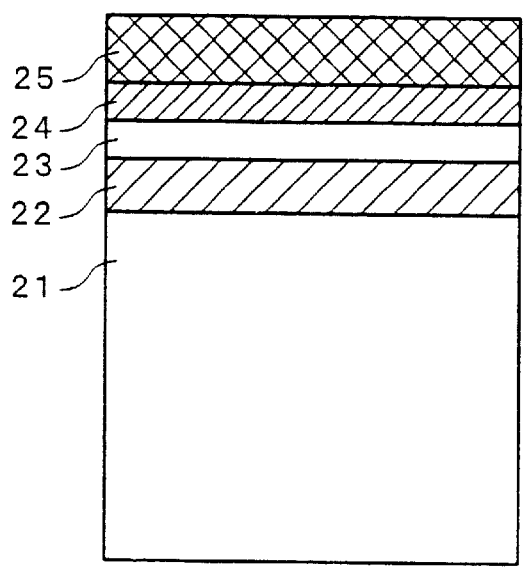
FIG. 2 is a diagram showing the structure of a super-resolution medium using a prior art inorganic super-resolution film.

Next, a specific example of the super-resolution medium of this invention will be given. From the results of FIG. 3, to increase the reflectance when the incident light intensity is increased, the film thickness of the Co—Si—Na—Ca—O film may be 50 nm, the film thickness of the reflecting film 25 may be 100 nm, the film thickness of the substrate protective film 22 may be from 120 nm to 150 nm, and the film thickness of the thermal buffer film 24 may be from 0 nm to 20 nm in the laminated construction of FIG. 2. Alternatively, the film thickness of the substrate protecting film 22 may be from 120 nm to 170 nm, and the film thickness of the thermal buffer film 24 may be from 130 nm to 150 nm. In these structures, the reflectance can be increased even if the film thickness of the Co—Si—Na—Ca—O film is varied from 30 nm to 70 nm. However, in these disks structures, although the reflectance increases when the incident light intensity is increased, its variation rate (R (after variation)—R (before variation)/R (before variation)) is 0.1 or less, so the improvement of recording/read-out density is probably relatively small.

Figure 8:
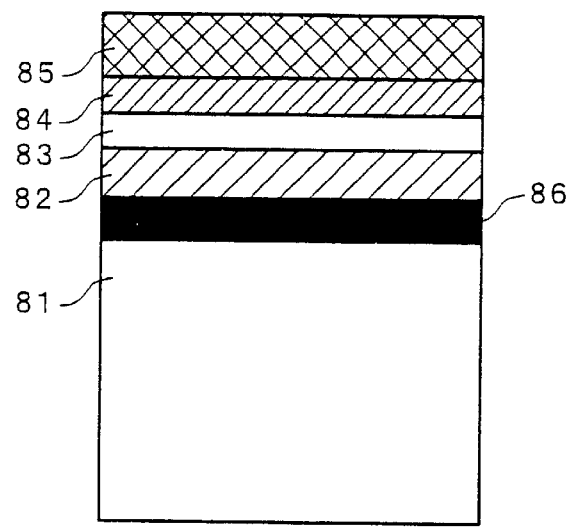
FIG. 8 is a structural diagram of a super-resolution medium using an inorganic super-resolution film according to one embodiment.

A laminated film structure of the optical disk medium 76 having a larger reflectance variation rate than that of the preceding example is shown in FIG. 8. First, information is recorded in phase pits on a polycarbonate substrate of diameter 12 cm and thickness 0.6 mm. On the side of the substrate on which information was recorded, a reflect addition film 86 (Ge—N film) of thickness approximately 50 nm is formed by magnetron sputtering, a substrate protective film 82 ($ZnS$—$SiO_2$ film) of thickness approximately 55 nm is formed, and a super-resolution film 83 ($Co_3O_4$ film) is then laminated to a thickness of 50 nm. Further, a thermal buffer film 84 ($ZnS$—$SiO_2$ film) of thickness approximately 30 nm is formed, and a reflecting film 85 (Al—Ti film) is formed upon this to a thickness of 100 nm. If necessary, an ultraviolet light-curing resin protective layer is provided to protect the laminated film structure. Finally, if another disk of identical structure is made to adhere to the first disk via an adhesive layer, the disk is stronger and recording can be performed on both sides of the disk.

This $Co_3O_4$ film has a property whereby its complex refractive index changes when irradiated with laser light above a certain threshold. Due to the light spot irradiation, the complex refractive index changes in a region where the temperature is higher, the reflectance in this region increases as a result of multi-interference, and only recording marks in the high reflectance region are reproduced. The resolution with which recording marks formed on the substrate are read out is determined by the size of the overlap-between a part where the change of the complex refractive index occurred in the inorganic super-resolution film, and the light spot. In other words, higher densities can be achieved by reducing the size of the part where a change of complex refractive index occurs. This effect is referred to as the super-resolution effect of the medium. In addition to the aforesaid $Co_3O_4$ film, other inorganic super-resolution films can be used comprising one of an oxide, nitride, sulfide, fluoride or carbide, and which are combinations of elements comprising plural compounds. Inorganic super-resolution films comprising an oxide, nitride, sulfide, fluoride or carbide which are combinations of three or more elements have the advantage of being resistant to high temperature during recording, and allowing read to be performed a large number of times.

The reflectance when the complex refractive index of the $Co_3O_4$ film changes can be increased by the reflect addition film (Ge—N film) 86 interposed between the substrate 81 and the substrate protective film 82. Due to the interposition of the Ge—N film, there is a reflection effect at the interface between the substrate 81 and the Ge—N film 82. Thus, a medium can be manufactured wherein the reflectance varies largely in the increasing direction, and which could not be obtained when the Ge—N film was not interposed.

Figure 3:
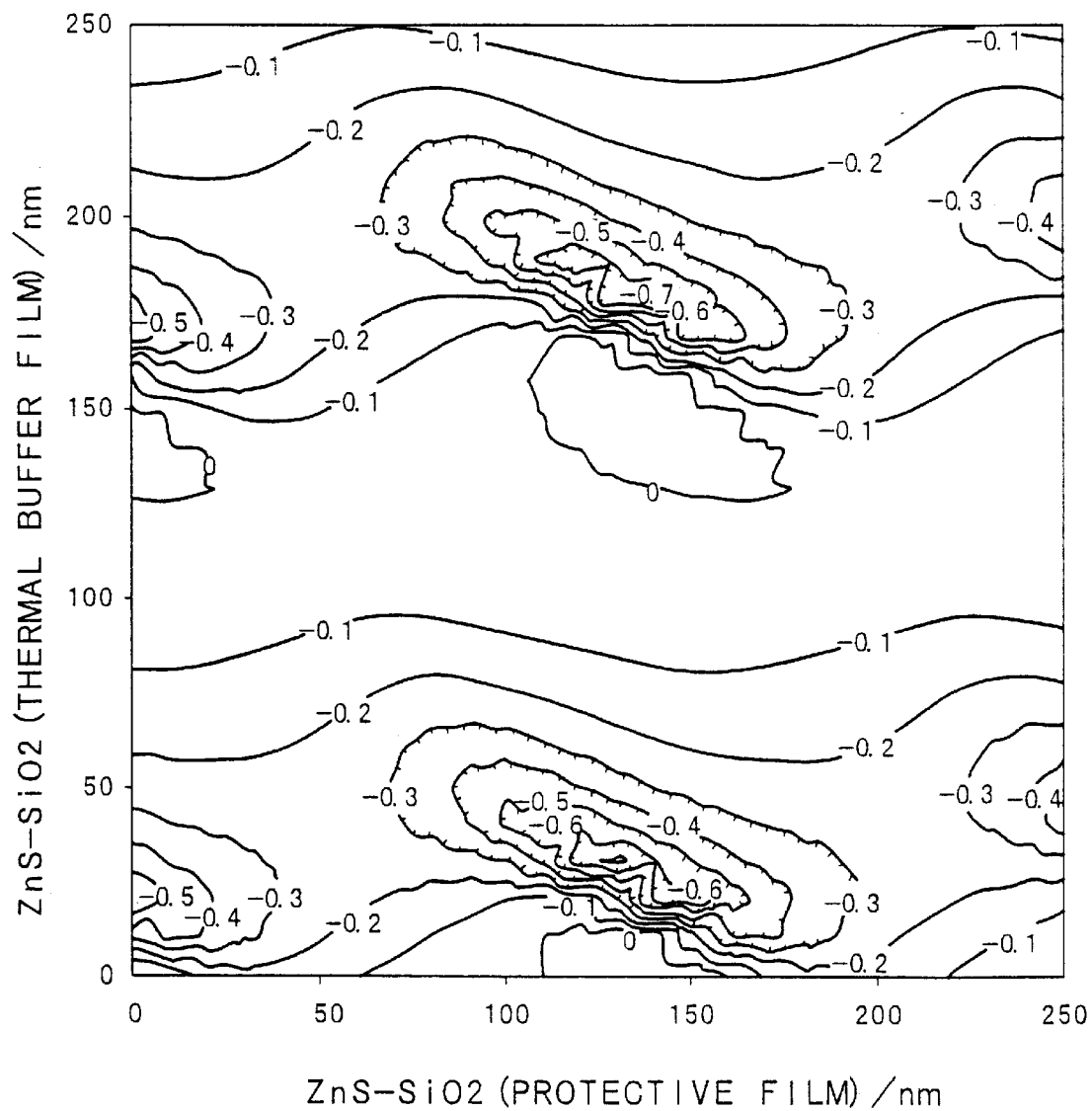
FIG. 3 shows a reflectance variation rate due to the super-resolution effect in a medium of prior art construction.
Figure 9:
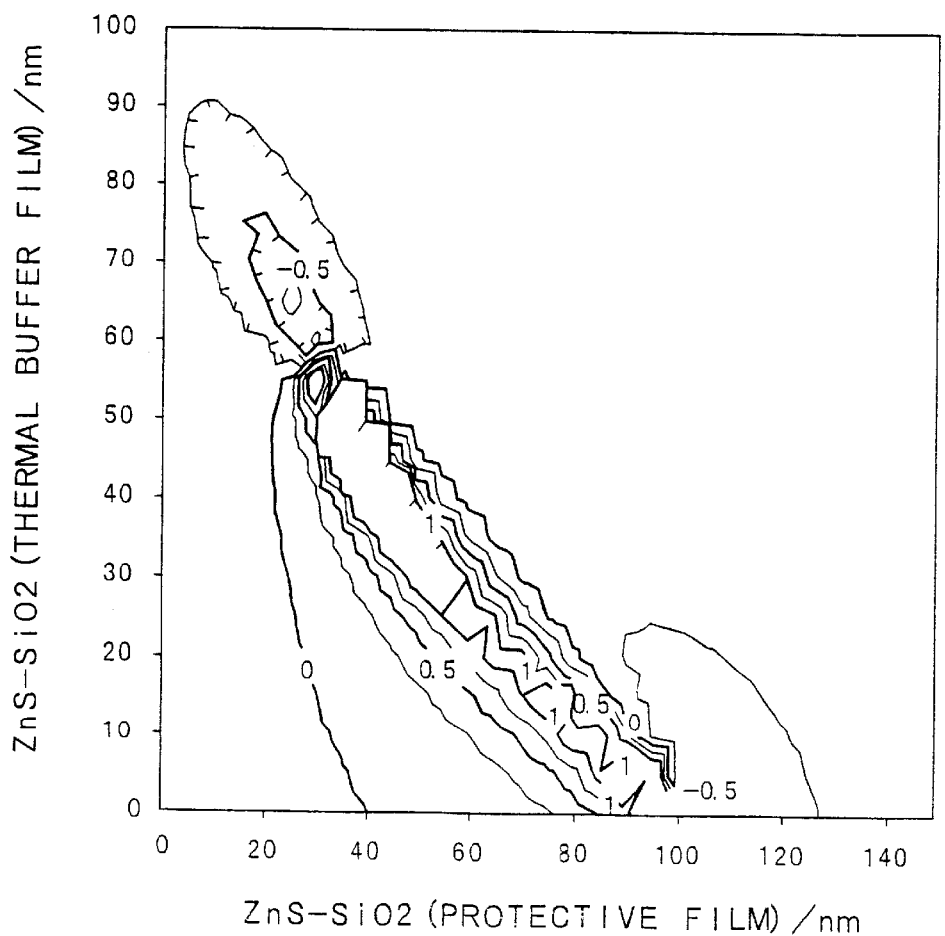
FIG. 9 is a diagram showing a reflectance variation rate due to a super-resolution effect in a medium wherein a reflect addition film is interposed.

For purposes of comparison with the results of FIG. 3, the reflectance variation rate due to change in the complex refractive index of the super-resolution film was calculated when the Ge—N film was interposed. In FIG. 9, the reflectance variation rate (R (after change)—R (before change))/R (before change) was calculated under the super-resolution effect when the film thickness of the reflect addition film 86 (Ge—N film) was 50 nm, the film thickness of the inorganic super-resolution film 83 ($Co_3O_4$) was 50 nm and the film thickness of the reflecting film 85 (Al—Ti film) was 100 nm, while the film thicknesses of the substrate protective film 82 (ZnS—$SiO_2$) and thermal buffer film 84 (ZnS—$SiO_2$) were varied. The results are shown by contour lines. It was assumed that the complex refractive index of the $Co_3O_4$ inorganic super-resolution film 83 changes from n (refractive index)=2.48 and k (extinction coefficient)=0.48 to n=2.41 and k=0.57 when the incident light intensity increases. The variation rate is 1 or more when the thickness of the ZnS—$SiO_2$ substrate protecting film 82 is in the range 40 nm–60 nm and that of the ZnS—$SiO_2$ thermal buffer film 84 is in the range 30 nm–50 nm, i.e., the reflectance after change is more than twice the reflectance before change. As the variation rate when the reflectance increases is of the order of 0.1 from the results of FIG. 3, it can be seen that the increase of reflectance is more pronounced due to interposition of the Ge—N reflect addition film 86.

An identical effect can be obtained using materials other than Ge—N, but it is necessary to use a material having a larger refractive index than that of the substrate (1.58). As the reflection effect at the interface increases the larger the difference of these refractive indices, it is preferable to use a material which gives a large refractive index difference, however absorption by this layer should also be low. Examples of materials other than Ge—N are thin films using Si—N or metal reflecting films such as Au, Ag or Al. It should be noted that if these materials are used, the film thickness of each layer must be recalculated.

By calculating the complex refractive index variation of $Co_3O_4$ from the experimental results, it would appear that there is a change from n (refractive index)=2.48, k (extinction coefficient)=0.48 to n (refractive index)=2.41, k (extinction coefficient)=0.57 after light irradiation. The variation of extinction coefficient is much larger than the variation of refractive index, a fact which would indicate that in the case of the $Co_3O_4$ film, the effect of the extinction coefficient variation has a large impact on the reflectance rate variation.

If an oxide, nitride, sulfide, fluoride or carbide is used for the inorganic super-resolution film which is a combination of elements comprising plural compounds instead of the aforesaid $Co_3O_4$ film, it may be possible to manufacture a laminated film structure having a high reflectance without interposing the Ge—N film. This may be because of a complex refractive index variation different from the complex refractive index variation of the $Co_3O_4$ film, or because the complex refractive index before the change occurs is different depending on the material. In this case, it is unnecessary to interpose the Ge—N film, and as the number of layers is consequently less, it is also desirable from the viewpoint of increasing productivity. To increase reflectance in the prior art four-layer structure of the prior art in FIG. 2, the materials used for the super-resolution film should undergo a variation of complex refractive index from n (before change)=2.4±0.5, k (before change)=0.4±0.2, to values satisfying n (after change)=n (before change)+0.4 or higher, n (after change)=n (before change)−0.4 or lower, or k (after change)=k (before change)−0.1 or lower.

Figure 4:
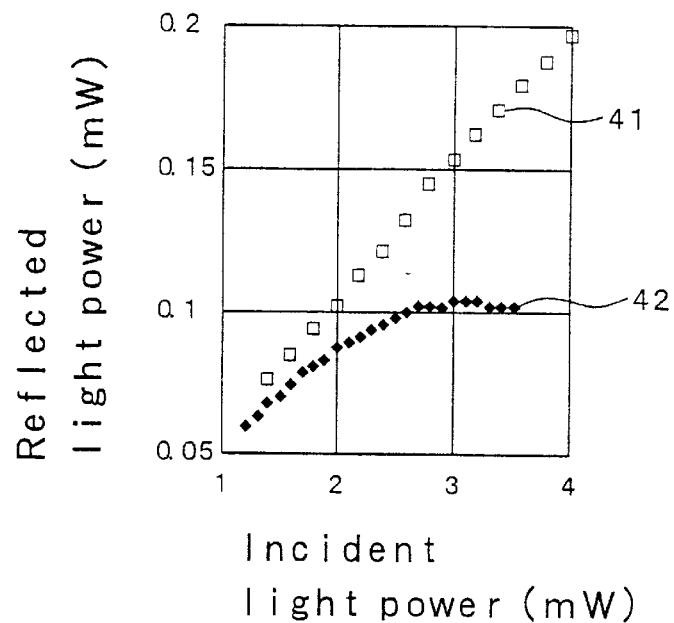
FIG. 4 is a diagram showing a reflected light intensity variation (measured values) relative to incident light intensity variation in the medium of prior art construction.
Figure 5:
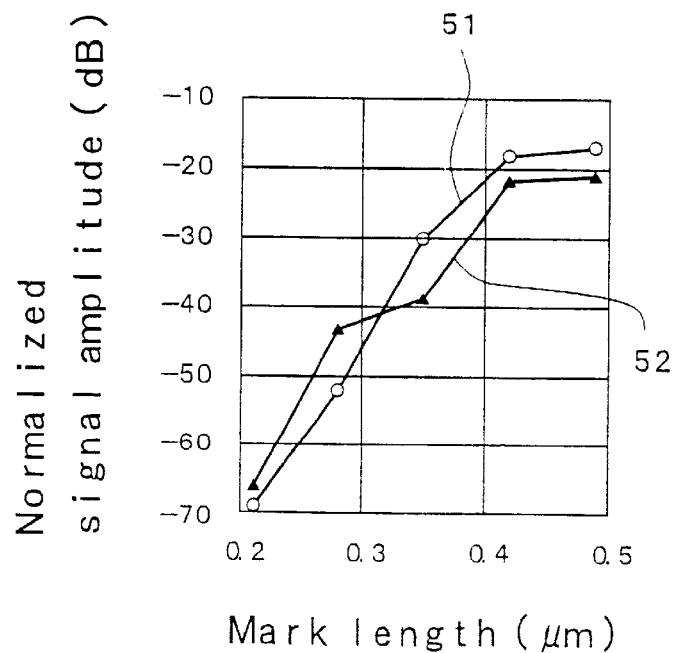
FIG. 5 is a diagram showing a read-out signal amplitude variation (normalized at a mirror surface level) relative to mark length in the medium of prior art construction.
Figure 6:
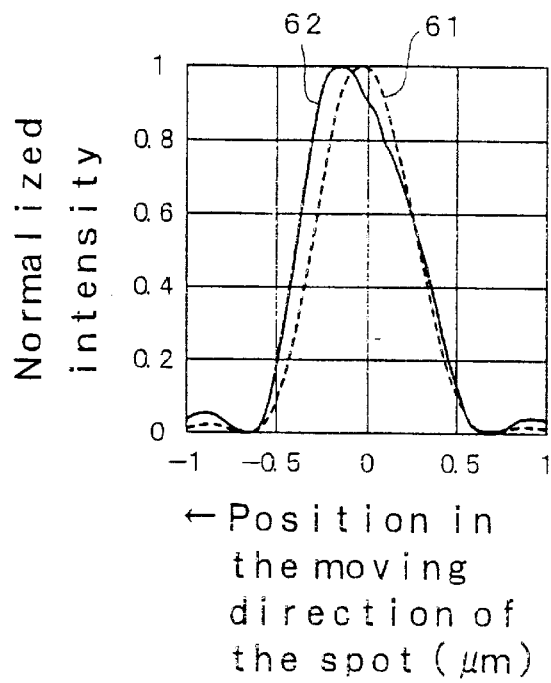
FIG. 6 is a diagram showing an effective read-out spot shape (calculated values) in a spot scanning direction in the medium of prior art construction.
Figure 10:
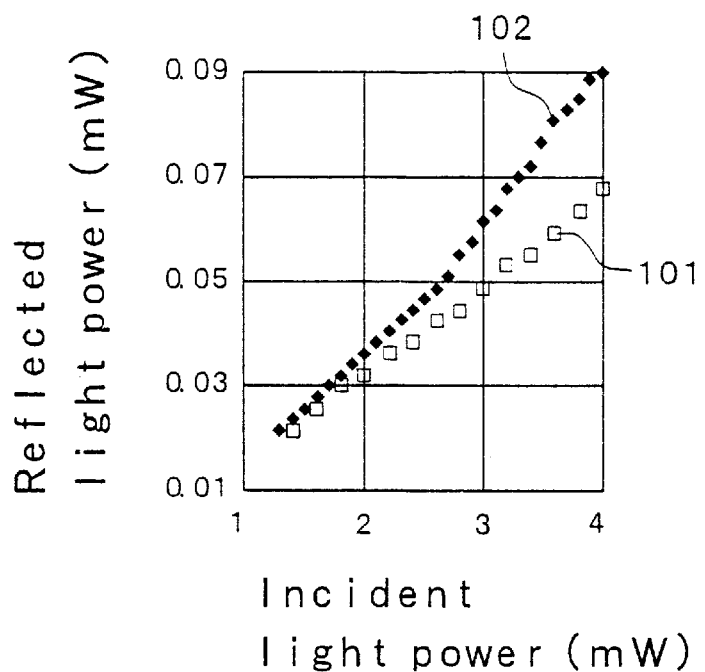
FIG. 10 is a diagram showing a reflected light intensity variation (measured values) relative to incident light intensity variation in the medium according to this embodiment.
Figure 11:
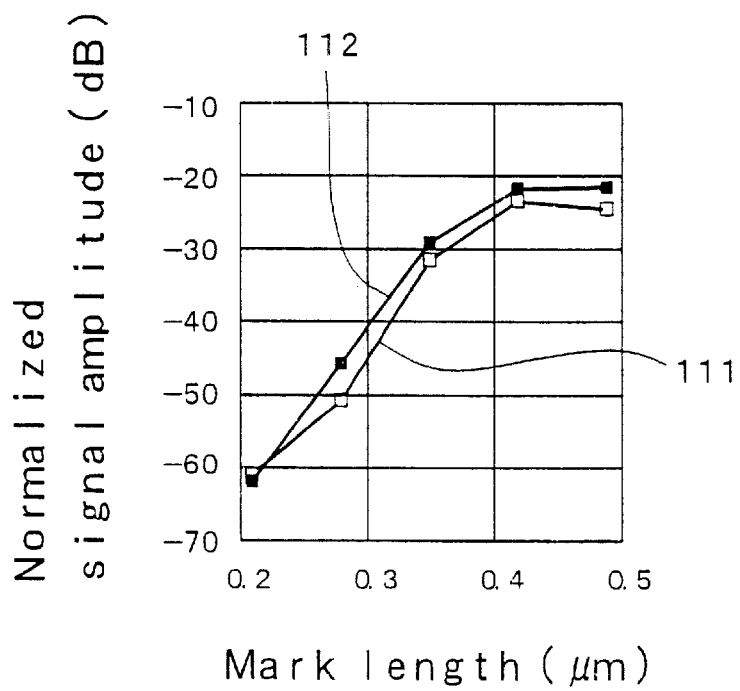
FIG. 11 is a diagram showing a read-out signal amplitude variation (normalized at a mirror surface level) relative to mark length in the medium of this embodiment.

Next, the results will be described for performing measurements and verifying the effect produced by a prototype of the disk of this embodiment. The measurement conditions were identical to those described in the case of FIG. 4. FIG. 10 shows the results of measuring reflected light intensity relative to incident light-intensity. It is seen that for result 101 (□(empty squares)) when the super-resolution effect is absent, there is a direct proportional relationship, but for result 102 (♦(black diamonds)) when the super-resolution effect is present, the direct proportional relationship breaks down and the reflectance varies in the increasing direction when the light intensity is increased. The results of measuring the amplitude of the read-out signal from this disk are shown in FIG. 11. The signal amplitude is normalized by the reflected light level. Result 112 for read-out when the super-resolution effect is produced shows an increased amplitude of a mark length of 0.28 $\mu$m near the optical cutoff (mark length 0.275 $\mu$m) compared to result 111 when the super-resolution effect is absent. Here also, there was no decrease of amplitude at a mark length of 0.35 $\mu$m and above.

Figure 12:
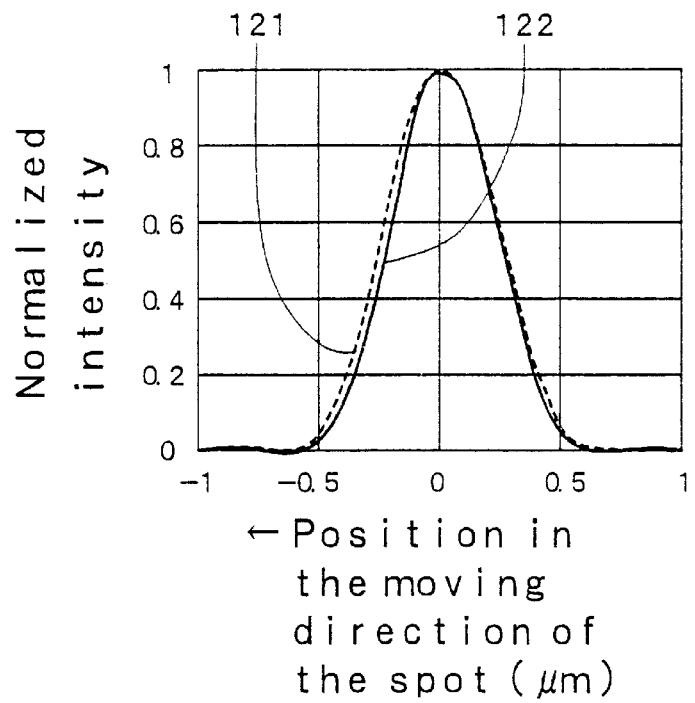
FIG. 12 is a diagram showing an effective read-out spot diameter (calculated values) in the spot scanning direction of the medium according to this embodiment.

The effective read-out spot shape was also calculated by simulation. FIG. 12 is a plot of ordinary read-out spot shape and effective read-out spot shape in the spot scanning direction when the super-resolution effect was produced, the respective peak values being normalized. In the case of the effective read-out spot when the super-resolution effect is present, 122, the peak diameter (width at $1/e^2$ of the peak value) decreased by 5% compared to the ordinary read-out spot 121. This shows that by adopting a structure for the medium whereby the reflectance increases when the incident light intensity increases, the width of the effective read-out spot becomes narrower, and frequency characteristics are obtained for the read-out signal which permit an increase of recording density. It is thus evident that in order to achieve high recording densities with optical disks using inorganic super-resolution films, a structure must be adopted wherein the reflectance increases when the incident light intensity increases. Further, when a $Co_3O_4$ film is used for the inorganic super-resolution film, a structure having higher reflectance can be obtained by interposing a Ge—N film between the substrate protective film and the substrate.

To increase the recording density, it is desirable to use a material in the composition of the $Co_3O_4$ film for which the complex refractive index varies sharply at a value between 60% to 85% of the peak temperature in the temperature distribution produced by the optical spot as a threshold. As a result, the region where the reflectance changes is limited to the center part of the light spot, and the effective read-out spot can be further reduced. It is desirable that the variation of complex refractive index is such that the value in an imaginary part of the complex refractive index (extinction coefficient) increases from 0.3 to 0.5 before change to 1.0 and above after change, and if it varies up to around 3.5 to 4.5, the reflectance in the region of variation is approximately 50%. In this case, sufficient signal strength can be obtained even if the region where the reflectance varies is limited to the center part of the light spot, which is preferable. The phenomenon whereby the extinction coefficient varies sharply at a certain temperature as threshold may be due to semiconductor-metal transitions. It may be elicited by adopting a composition for the $Co_3O_4$ film wherein semiconductor-metal transitions occur, or by using an oxide comprising one or more elements chosen from Co, Fe, Ni, Cu, Ag, V for the inorganic super-resolution layer so that semiconductor-metal transitions occur.

Figure 13:
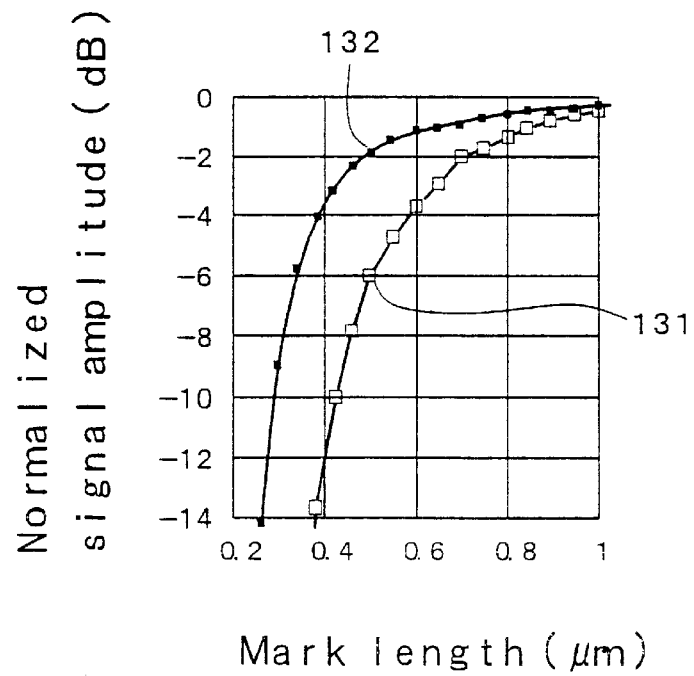
FIG. 13 is a diagram showing a read-out signal amplitude variation relative to mark length (normalized for a mark length of 1.5 μm) when the extinction coefficient of a $Co_3O_4$ layer varies in a transition-like manner at a temperature which is 75% of a peak value of temperature distribution, and there is assumed to be a variation from an initial value of 0.47 to 4.0.

In the aforesaid embodiment, the amplitude variation of the read-out signal relative to mark length was calculated under conditions where the extinction coefficient of the $Co_3O_4$ film varied sharply to 4.0 after change at a value of 75% of the peak temperature in the temperature distribution produced by the light spot (FIG. 13). Result 132 for the case when the super-resolution effect was present and result 131 for the case when the super-resolution effect was absent, were respectively normalized by the signal amplitude at a mark length of 1.5 μm. Considering the region up to a mark length corresponding to an amplitude of −12 dB as the region which is practically usable for reading information, the mark lengths at −12 dB were compared. When there was no super-resolution effect, i.e. 131, the mark length was 0.4 μm, and when there was a super-resolution effect, i.e., 132, the mark length was 0.28 μm, representing a linear density increase of 1.4 times. Assuming that an identical density increase holds in the radial direction, this represents an area density increase of approximately 2 times.

Figure 14:
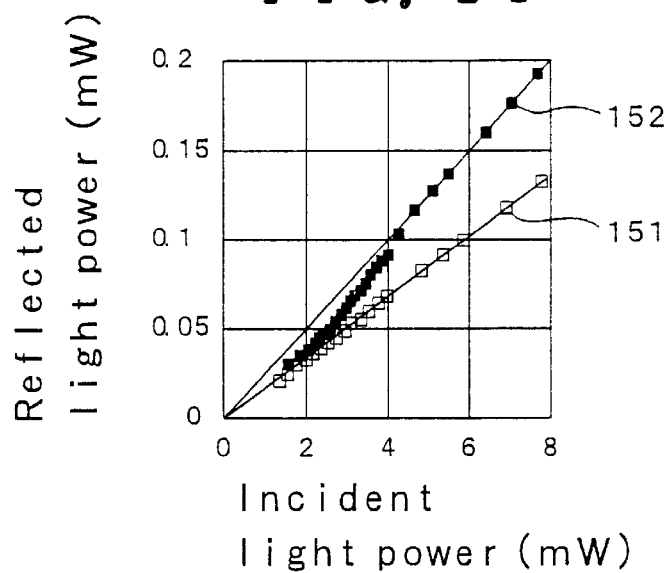
FIG. 14 is a diagram showing the results of performing the measurements of FIG. 9 up to the vicinity of the recording power.

In the aforesaid embodiment, the case was described of a read-only disk wherein recording marks were prerecorded as phase pits, but an identical effect may be expected also for write-once disks, phase change optical disks and magneto-optical disks. To obtain a stack structure wherein the reflectance increases when the incident light intensity increases by using the inorganic super-resolution film of the aforesaid embodiment in a write-once disk or a rewritable disk, it is necessary to calculate and design the reflectance change in a multi-layer film structure having a recording film and a film for controlling thermal properties. If a structure is adopted wherein the reflectance increases when the incident light intensity increases, during recording, the disk is irradiated with optical pulses having three to ten times the intensity during read-out, and it is possible that as the reflectance of the disk increases, light absorption decreases so that the recording marks are not properly formed. However, the complex refractive index of the super-resolution film does not change without limit as the power is increased, but becomes saturated at a light irradiation of 5–6 mW and above. FIG. 14 is the result of further expanding the range of FIG. 10 showing the relation of reflected light intensity to incident light intensity in the disk shown in FIG. 8. It is seen that in the case where the super-resolution effect is present, the reflected light intensity varies on a straight line in direct proportion to incident light intensity at 6 mW or above, but the reflectance tapers off at around 6 mW, and does not vary even if the incident light intensity is further increased. Regardless of disk structure, the reflectance variation of nearly all inorganic oxide super-resolution disks tends to become saturated at around 5 mW–8 mW.

Figure 15:
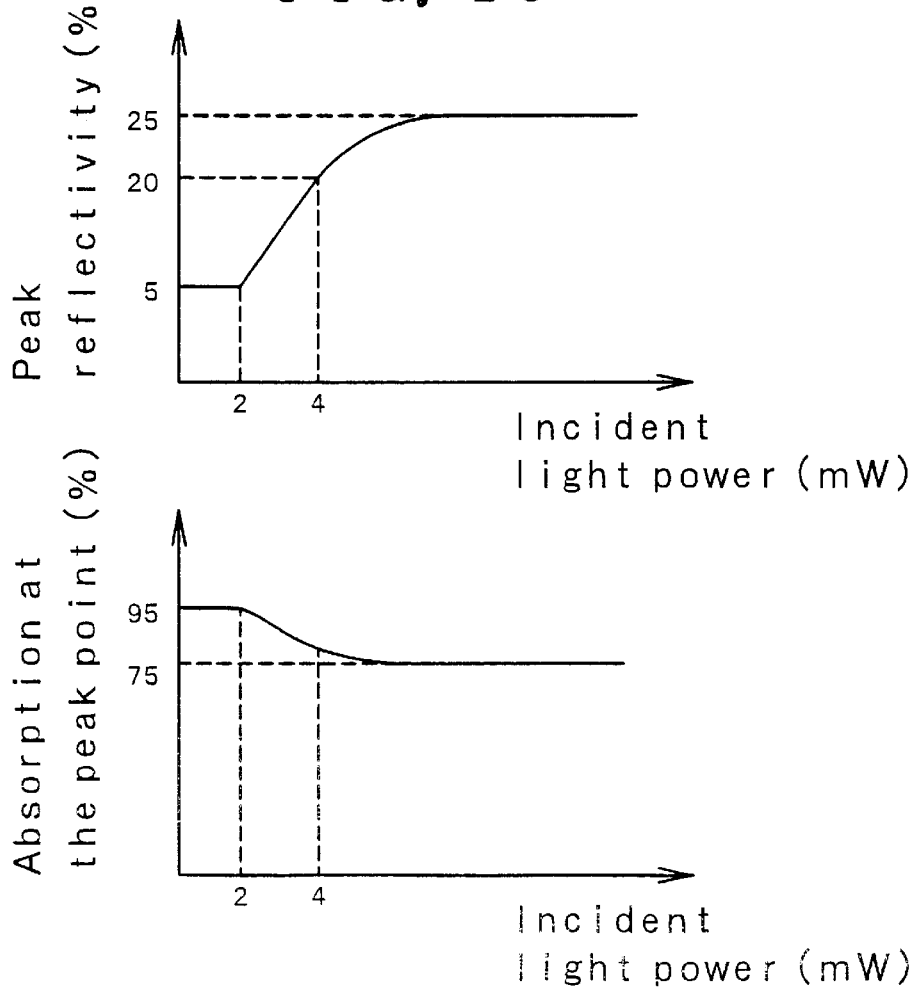
FIG. 15 is a diagram showing reflectance variation and light absorbance variation when the incident light is intensified up to the vicinity of the recording power.
Figure 16:
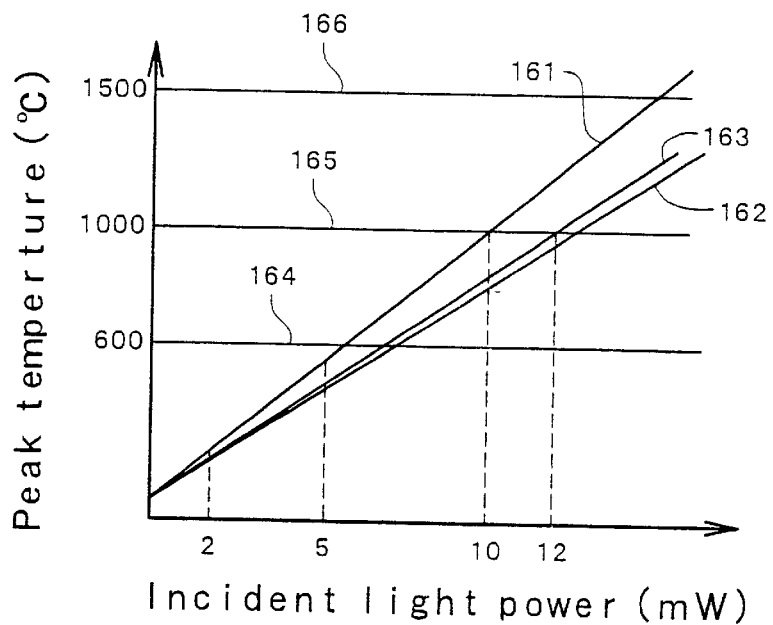
FIG. 16 is a diagram showing the relation between incident light intensity and a temperature peak of a recording film.
Figure 17:
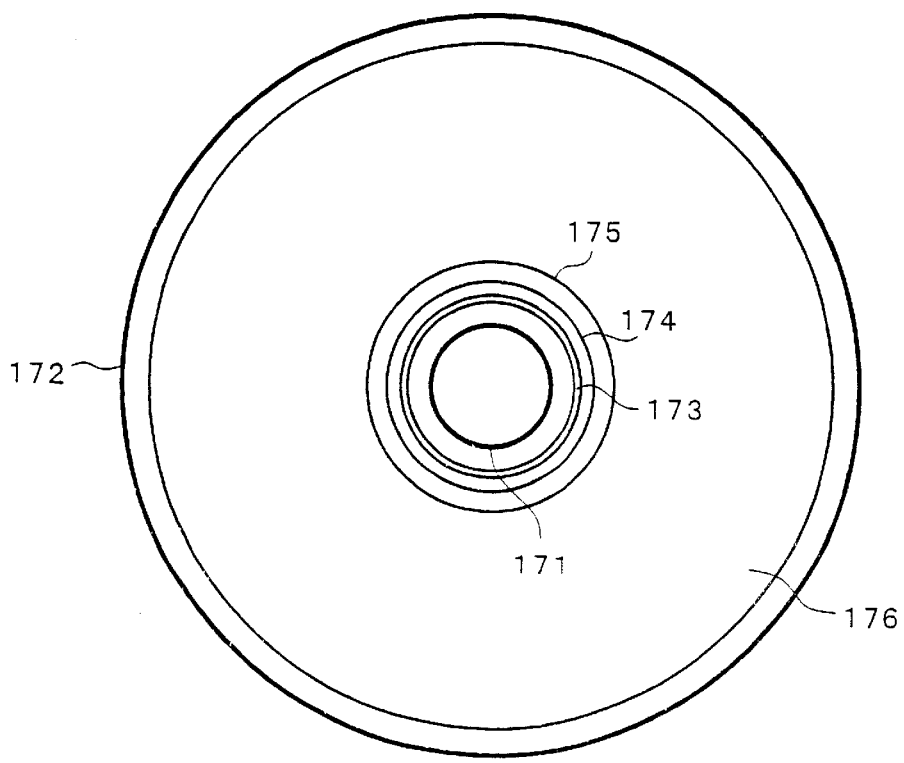
FIG. 17 shows an example of the structure of a data region in an inorganic super-resolution disk.

In the light of this behavior, a rewritable phase change disk will now be considered having a disk structure comprising an inorganic super-resolution film wherein the reflectance increases when the incident light intensity increases. The reflectance variation of a disk having an initial reflectance of 5% and a reflectance of 20% when read-out light of 4 mW is incident, becomes saturated at 5–6 mW, and therefore has the characteristics in the upper part of FIG. 15. The absorbance (%), on the other hand, is given by 100%-reflectance (%), and therefore has the characteristics shown in the lower part of FIG. 15. During recording, the peak temperature normally has to be increased up to the vicinity of 1000° C. as shown in FIG. 16, which requires an irradiation of 10 mW–15 mW. Therefore, when the disk is irradiated by light pulses required for recording, the reflectance variation becomes saturated, the reflectance distribution inside the light spot is less than during read-out, and there is practically no effect on recording. Further, the recording power increase required due to a reflection increase from 5% to 25% is (95/75)=1.26 of the recording power required for a 5% disk, and if 10 mW is needed to record a 5% reflectance disk 161, 12.6 mW will be required to record a 25% reflectance disk 162. This power can however easily be obtained with present semiconductor lasers and does not present any problem in practice. In this disk, the relation between incident light intensity and peak temperature varies as shown by a line 163 between 161 and 162, as shown in FIG. 16. A melting point 166 of the inorganic super-resolution film is in the vicinity of 1500° C., and as melting does not occur even during recording, the disk can be written plural times.

The question of the level of the reflectance R at which recording is still possible after the reflectance variation becomes saturated, depends on the output of the semiconductor laser. In present DVD-RAM, disks having a reflectance of approximately 20% are recorded at a power of about 10 mW. Considering that the recording power can be increased by 1.5 times up to about 15 mW due to technical improvements in semiconductor lasers, it appears that recording would be possible with a disk for which R satisfies the relation 80/(100-R)<1.5, i.e., R<46%. Semiconductor lasers presently range from the 30 mW class to the 50 mW class, and the power has been increased by 1.6 times or more. Due to this fact, it is evident that the case of recording not being possible due to insufficient power will not arise with disks for which the reflectance after saturation does not exceed 46%.

As it is the temperature distribution which determines the size of the recording marks, even if the shortest mark which can be reproduced is smaller due to the super-resolution effect, minute recording marks suitable for increased reproduction capacities can be written by adjusting the temperature distribution. For this purpose, a trial recording region 175 is provided separately from a data recording region 176 as in the case of disks used for DVD-RAM, etc. If a trial recording mechanism is provided in a drive while adjusting recording waveform and recording power so as to form optimum recording marks in this region, optimum recording marks can be formed even in disks where the reflectance increases when the incident light intensity increases. The optimum recording power and recording waveform can be recorded as information on the disk and this information read by the drive, so that recording is performed with the optimum recording power and recording waveform for each particular disk, and optimum recording marks are formed even in disks where the reflectance increases when the incident light intensity increases. Further, if information is prerecorded in a read-in region (region read out first by the drive) 173 to identify the type of inorganic oxide super-resolution disk (read-only disk, write-once disk, rewritable phase change disk, magneto-optical disk and number of information recording layers), a distinction can be made from ordinary disks without super-resolution, so the recording and read-out of both super-resolution disks and ordinary disks can be performed by the same drive. This makes it possible to provide a drive having excellent backward compatibility, which is very desirable. The information is recorded in this read-in region 173 in the same construction as that of read-only disks or write-once disks not having the super-resolution film. If the information in the read-in region 173 is reproduced and the drive determines that the disk is a super-resolution disk, the drive reproduces a trial read-out region 174 provided on the disk, and sets an optimum read power. Subsequently, the optimum recording power and recording waveform are set in the trial recording region 175, and recording/read-out of the super-resolution disk is then performed. Alternatively, the optimum read power, recording power and recording waveform information is prerecorded in the aforesaid read-in region, from which this information is read by the drive, and recording/read-out is performed after making respective settings.

In the aforesaid optical disk, by combining a structure having a higher reflectance as in the aforesaid embodiment with a multilayer recording medium wherein the recording capacity is increased by forming plural information recording layers, the recording density of each recording layer can be increased by the super-resolution effect, but there is a further large advantage in that the reflectance only increases when the laser beam is focused on each recording layer, so autofocus and autotracking are stabilized. In a multilayer recording medium, if the reflectance is high at each laminated film containing a recording layer on the light incidence side, the light will no longer reach the next recording layer, and recording/read-out will not be possible. Therefore, the design must be such that the reflectance of each laminated film on the light incidence side is suppressed low, so that the recording/read-out of each recording layer is possible. However, autofocus and autotracking are unstable when the reflectance is low, so the setting of the reflectance of the laminated films is an extremely difficult matter.

In the optical disk described in the aforesaid embodiment, the effect whereby the reflectance varies when the incident light intensity increases (effect of FIG. 4 and FIG. 10) does not occur when the focus is shifted by 2 $\mu$m (about twice the focal depth) from the exact focus position. This shows that the effect is an effect which appears when the optical power density is sufficiently high. Normally, the gap between each of the recording layers of a multilayer recording medium is 10 $\mu$m–50 $\mu$m. When a structure having higher reflectance due to complex refractive index variation of the inorganic super-resolution film as shown in the above embodiment, is combined with each recording layer of a multilayer recording medium, even if the laser beam is brought to a precise focus on a particular layer, the distance from the laminated films containing recording layers on either side is much larger than the focal depth, and thus, the reflectance variation due to complex refractive index variation of the super-resolution film would not occur. Therefore, even if the reflectance is suppressed low at positions removed from the focus, sufficient reflectance can be obtained when the beam is focused so that autofocus and autotracking remain stable.

Instead of the inorganic super-resolution film, an identical effect may be obtained by using a photo-chromic organic dye or thermo-chromic material for the laminated film comprising the recording layer.

Figure 18:
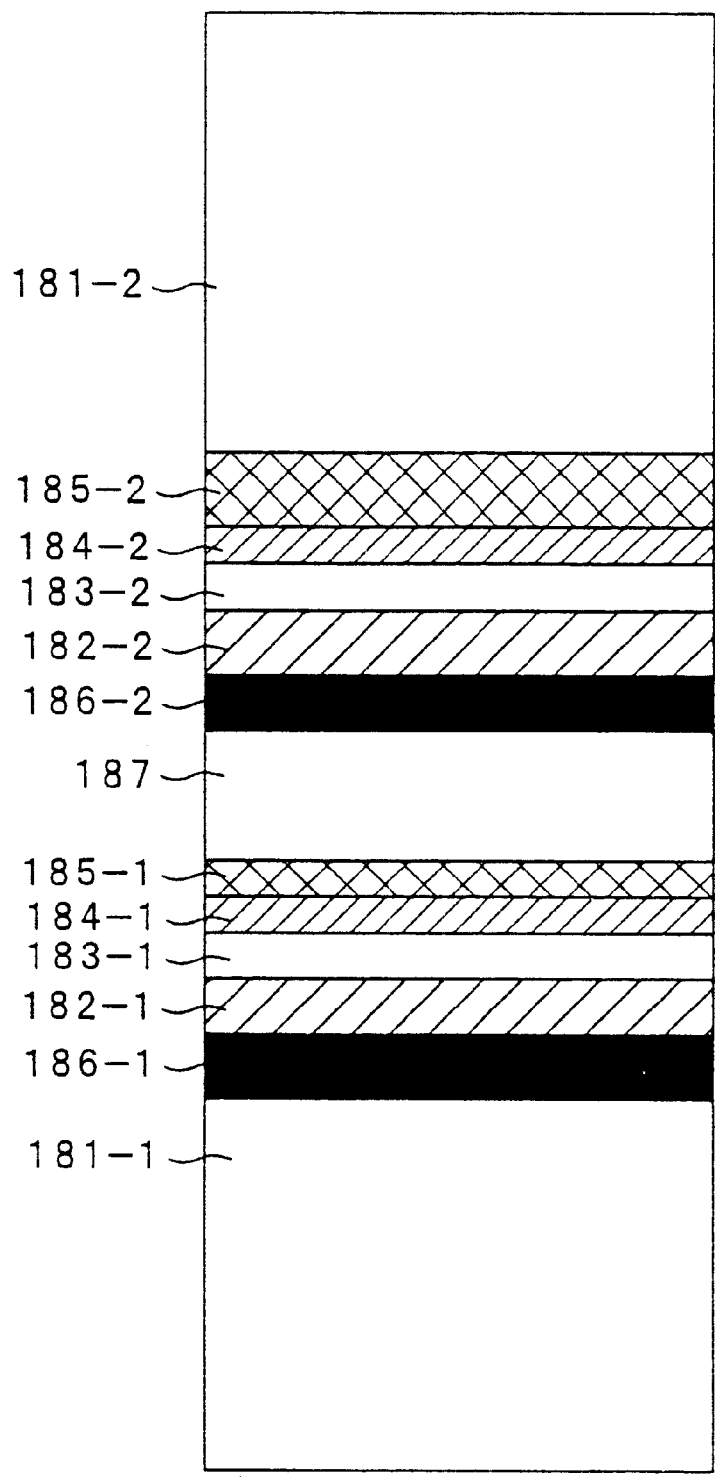
FIG. 18 shows an example of a two-layer recording medium.

If the number of recording layers in the multilayer recording medium is increased, the spot degenerates due to spherical aberration, so a two-layer recording-medium having two recording layers is a practical solution. FIG. 18 shows an example of such a two-layer recording medium. As a first recording layer, information is prerecorded in phase pits on a polycarbonate substrate having a diameter of 12 cm and thickness of 0.6 mm. A reflect addition film 186-1 (Ge—N film) of thickness approximately 50 nm is formed by magnetron sputtering on the side of the substrate on which this information was recorded, a substrate protective film 182-1 (ZnS—$SiO_2$ film) of thickness approximately 55 nm is formed, and an inorganic super-resolution film 183-1 ($Co_3O_4$ film) is then laminated to a thickness of 50 nm. Further, a thermal buffer film 184-1 (ZnS—$SiO_2$) film is formed to a thickness of approximately 30 nm, and a reflecting film 185-1 (Al—Ti film) is formed to a thickness of 10 nm upon this. Next, as a second recording layer, information is prerecorded in phase pits on a polycarbonate substrate of diameter 12 cm and thickness 0.6 mm. A reflecting film 185-2 (Al—Ti film) of thickness approximately 100 nm, thermal buffer film 184-2 (ZnS—$SiO_2$ film) of thickness approximately 30 nm, an inorganic super-resolution film 183-2 ($Co_3O_4$) of thickness approximately 50 nm, a substrate protective film 182-2 (ZnS—$SiO_2$ film) of thickness approximately 55 nm and a reflect addition film 186-2 (Ge—N film) of thickness approximately 50 nm are laminated by magnetron sputtering in the reverse sequence to that of the first laminated film on the side of the substrate on which information was recorded. The reflecting film 185-1 (Al—Ti film) and reflect addition film 186-2 are then made to adhere by providing an ultraviolet light-curing resin 187 between them, as shown in FIG. 18. Reproduction is performed by arranging read-out light to be incident from the side of the first substrate 181-1.

Hence, two sets of laminated films having information recording layers are provided, but the reflecting film 185-1 is made thinner than the reflecting film 185-2 so that all the light is not reflected by the first laminated film near to the incident light. In an ordinary two-layer medium, the reflectance of the first recording layer is low, so autofocus and autotracking are unstable and the device is not robust to disturbances during read-out. In the two-layer medium of this embodiment, however, the reflectance of each of the laminated films is higher when the incident light intensity increases, and this increase of reflectance occurs only when the super-resolution film 183 is present inside the focal depth of the reproducing light. Specifically, when the first layer is reproduced, the beam is brought to a focus on the first layer and the reflectance of the laminated film of the first layer increases, so autofocus and autotracking are stable. When the second layer is reproduced, the beam is brought to focus on the second layer, and the reflectance of the laminated film of the second layer increases, but as the focus is far removed from the super-resolution layer of the laminated film of the first layer, the increase of reflectance does not occur in the first layer, and read-out of the second layer is therefore not adversely affected.

Both the first recording layer (layer near the substrate) and second recording layer (next recording layer to the first layer viewed from the substrate side) can be combined with a film having a complex refractive index variation in a structure wherein the reflectance increases, but as there is no recording layer after the second layer, the initial reflectance can be increased without combining with an inorganic super-resolution film, if desired. Alternatively, a structure may be adopted wherein the initial reflectance of the first layer alone can be set low, and the reflectance is increased only when the spot is focused on the first layer by combining with a material identical to that of the super-resolution film of the aforesaid embodiment. By using a film wherein the complex refractive index changes in the first layer, the difficulty of reflectance design is lessened, and it is easier to manufacture a two-layer recording medium.

During read-out, the reflectance increases and the absorbance decreases relatively regardless of the number of recording layers, but if the thickness of each layer is determined so that the reflectance is low when the disk is irradiated by a very high laser power during recording, data damage due to the read-out light can be prevented without reducing the recording sensitivity.

The super-resolution effect is advantageous from the viewpoint of compatibility with existing optical disks as higher densities can be obtained without making major modifications to the device. In recent years, there have been attempts to commercialize a bluish violet semiconductor laser having a wavelength in the vicinity of 400 nm. High density DVD disks of capacities around 20 GB are now been developed using this bluish violet semiconductor laser. As the films in the optical disk medium described in the above embodiment have optical characteristics with a wavelength of 660 nm, which is different from a wavelength of around 400 nm, it would be necessary to optimize the film thickness of each layer, but an identical effect would probably be obtained also at a wavelength of around 400 nm. If this optical disk medium were used, in the case of a high density DVD device of around 20 GB, an optical disk medium with a recording capacity of 40 to 50 GB could therefore be manufactured.

Figure 19:
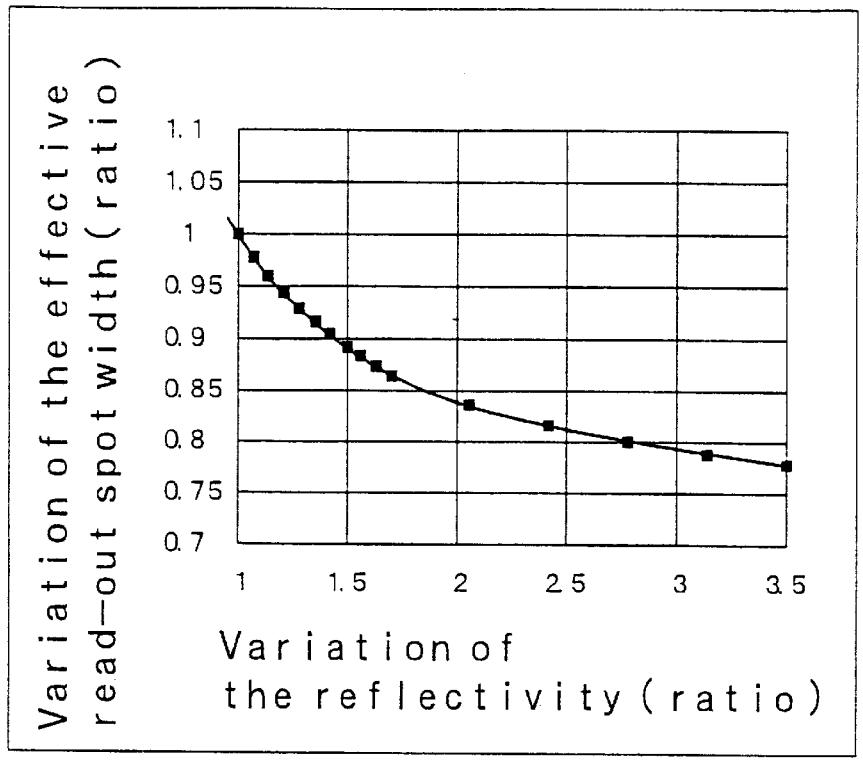
FIG. 19 is a diagram comprising an upper part showing a variation (ratio) of effective read-out spot width, and a lower part showing a variation of recording density, relative to the reflectance variation (ratio) during super-resolution read-out of an inorganic super-resolution medium.
Figure 19:
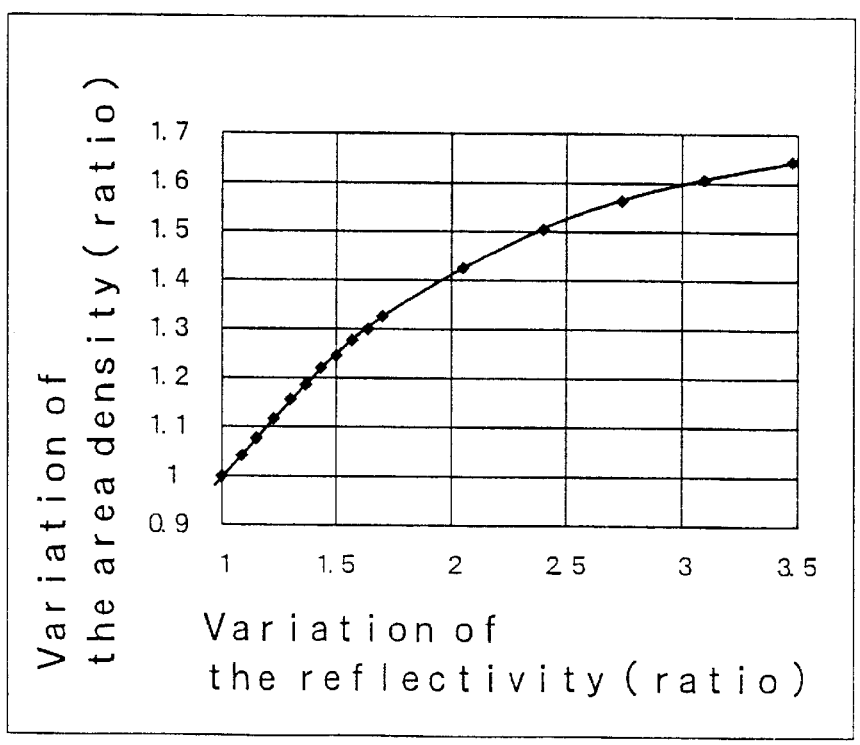

From the viewpoint of compatibility with existing optical disks, methods are being studied to use this bluish violet semiconductor laser in a construction similar to a prior art optical system. In the case of DVD, the object lens NA is 0.6, and the capacity can be increased by 2.7 times by a spot reduction effect due to shorter wavelengths. As a DVD has a capacity of 4.7 GB, it would have a capacity of 12.8 GB if the capacity were increased by 2.7 times. However, for next generation DVD, a capacity of 15 GB (or 20 GB) is desired as this would permit the recording of 2 hours of HDTV moving images, and therefore, the shorter wavelength effect alone may be insufficient. It is thus necessary to further increase the capacity by 1.2 times (1.56 times in the case of 20 GB) by some method. The upper part of FIG. 19 shows a calculation of the reduction amount of the effective read-out spot diameter relative to reflectance when read-out is performed with super-resolution and when the super-resolution effect is absent. The lower part of FIG. 19 shows a calculation of the recording density increase amount relative to reflectance when read-out is performed with super-resolution and when the super-resolution effect is absent. From these results, it would appear that if the inorganic oxide super-resolution medium were applied to next generation DVD, and a structure were adopted for the medium wherein the reflectance during read-out with super-resolution (read-out light intensity about 1.5 mW to 4 mW) changes by 1.3 to 1.7 times compared to the case of ordinary read-out (read-out light intensity 0.5 mW or less), it would be possible to reduce the effective read-out spot diameter by 0.9 times, and increase the capacity by 1.2 times to 15 GB. Likewise, if the inorganic oxide super-resolution medium were applied to next generation DVD and a structure were adopted for the medium wherein the reflectance during read-out with super-resolution (read-out light intensity about 1.5 mW to 4 mW) changes by 3.0 to 4.0 times compared to the case of ordinary read-out (read-out light intensity 0.5 mW or less), it would be possible to reduce the effective read-out spot diameter by 0.8 times, thereby increasing the capacity by 1.56 times to 20 GB. Hence, by combining the bluish violet semiconductor laser with an optical disk system for existing optical disks and an inorganic oxide super-resolution medium, an optical disk device and optical disk medium-capable of recording two hours of high-definition moving images while maintaining compatibility with existing optical disks, and which are highly desired by users, could be manufactured.

According to this invention, recording density can be increased by approximately two times due to a super-resolution effect of a medium without making major modifications to the optical system of an optical disk device.

What is claimed is:

1. An optical disk medium comprising:
   a substrate;
   a laminated film comprising two or more layers of thin films;
   wherein said substrate has a phase pits containing information;
   wherein one of said layers being comprised of an inorganic super-resolution film;
   wherein the layers of the laminated film are in the solid-state when an information reproducing light is incident, and the reflectance of the laminated film increases non-linearly with light intensity.

2. An optical disk medium according to claim 1, wherein the laminated film of the optical disk medium comprises two sets of laminated films each having one of said super-resolution films.

3. An optical disk medium according to claim 1, wherein at least one of a disk identification signal, an optimum reproduction light intensity value and an optimum recording light intensity value is recorded in an information recording/read-out region of the surface of the optical disk medium.

4. An optical disk medium according to claim 1, comprising a trial read-out region in the information recording/read-out part of the optical disk to set an optimum read-out light intensity value when the optical disk is reproduced.

5. An optical disk medium according to claim 1, comprising a trial recording region in the information recording/read-out part of the optical disk medium to set an optimum recording light intensity value or an optimum recording waveform pattern when information is recorded on the optical disk.

6. An optical disk medium according to claim 1, wherein said inorganic super-resolution film is an oxide thin film comprising Co.

7. An optical disk medium according to claim 6, wherein a thin film having optical constants different from those of the substrate is interposed, directly or via another layer, between the oxide thin film comprising Co and the substrate.

8. An optical disk medium according to claim 7, wherein the thin film, having optical constants different from those of the substrate, comprises Ge—N or Si—N.

9. An optical disk medium according to claim 7, wherein the thin film, having optical constants different from those of the substrate, comprises Au, Ag, or Al.

10. An optical disk medium according to claim 1, wherein the reflectance during read-out is from 1.3 times to 1.7 times the reflectance at a light intensity approximately ¼ that of the read-out light.

11. An optical disk medium according to claim 1, wherein the reflectance during read-out is from 3.0 times to 4.0 times the reflectance at a light intensity of approximately ¼ that of the read-out light.

* * * * *